Patented July 3, 1951

2,559,152

UNITED STATES PATENT OFFICE 2,559,152

ISOTOPE CONCENTRATION PROCESS

Aristid V. Grosse, Haverford, Pa., and Allen F. Reid, Dallas, Tex., assignors to Sun Oil Company, Philadelphia, Pa., a corporation of New Jersey No Drawing. Application February 4, 1948, Serial No. 6,346

3 Claims. (Cl. 23—150)

This invention relates to the preparation of a catalyst or contact mass suitable for use in chemical operations generally, specifically in the concentration of isotopes, as will appear hereinafter, and to the novel catalyst or contact mass thus prepared.

In Serial No. 534,023 filed May 4, 1944, by Allen F. Reid, now Patent No. 2,435,796, there is described and claimed a process for the relative concentration of isotopes of carbon and oxygen comprising reaction between carbon dioxide, carbonic acid, bicarbonate ion and water in presence of a heterogeneous catalyst packing containing a member of the group consisting of silicon oxide, a silicate, carbon and aluminum oxide. The reaction is effected by flowing carbon dioxide into the mixture of carbon dioxide, carbonic acid, bicarbonate ion and water at certain there described rates. A fluid enriched in the desired isotopes of carbon and/or oxygen is taken off the catalyst or contact mass.

The catalysts mentioned in the above-identified application are as follows: etched siliceous shale, etched "Pyrex" (a heat resistant glass) helices, calcined silica gel, lead carbonate on aluminum oxide, aluminum oxide, charcoal and fiber glass.

The necessity for the foregoing catalysts or contact masses is made apparent in said application. Thus, it was not until heterogeneous catalysis was applied to isotope concentration of this sort that equilibrium concentrations of the desired isotopes could be attained with a reasonably sized plant and within a period of time which was not prohibitory. As set forth in said application the approach to equilibrium, of the several reactions which take place, occurs very slowly in the absence of a suitable catalyst or contact mass. Such a catalyst or contact mass must have a large surface area and must be such as to cause close contact between the gaseous and liquid phases extant in the system.

According to this invention we have found that an improved contact tower packing, which will yield improved results in the isotopic concentration of carbon and oxygen, can be prepared from aluminum treated with a solution containing essentially a sodium silicate. The aluminum should be in a sub-divided form and will ordinarily be in the shape of rings, saddles, coils, spirals, blocks, grids, wire, tubes or other shapes found useful in countercurrent operation between a liquid and a gas.

Thus, according to this invention the aluminum material is treated with a water solution containing essentially an alkali silicate. When sodium silicate is employed, the ratio of $Na_2O$ to $SiO_2$ will be preferably in the range of

$$25Na_2O : 1SiO_2$$

to $1Na_2O:4SiO_2$. Much higher ratios can be employed. The solution of the silicate is made preferably with water. The concentration of the sodium silicate in the water solution can be varied. However, this concentration must not be such that the solution becomes too viscous, at the temperature of treatment, to permit of a mild agitation.

The treated aluminum is found to possess a catalytic surface which is strongly adherent, abrasion resistant and insoluble in the bicarbonate solution which is used in the isotope concentration process.

The conditions of the treatment of the aluminum with the aforementioned silicate solution can be varied but due care must be exercised in their selection and correlation.

As already stated, the ratios of $Na_2O$ to $SiO_2$ can be varied. The temperature can also be varied. Thus, the temperature can be as low as desired provided that the solution employed is not too viscous at the temperature of treatment to accomplish desired agitation. Also, the temperature can approach the boiling point of the said solution.

The time of the treatment of the aluminum with any particular solution of sodium silicate will depend upon its concentration and temperature as well as upon the degree of agitation. Other factors to be considered are the size and roughness of the aluminum particles and the ratio of the solution to the metal. Aluminum rings or helices suited for the isotopic concentration processes discussed herein have been prepared in less than about one hour contact time. It is clear that one versed in the art can readily determine when the aluminum surface has been treated to a sufficient extent. Accordingly, the invention is not to be limited to any particular time of contact between the aluminum and the sodium silicate solution.

The agitation is required to ensure exposure of all of the surfaces of each piece of aluminum to the action of the treating solution in order to accomplish a substantially uniformly prepared surface. The agitation should be mild so that the coating being formed is not destroyed or damaged during the treatment.

The aluminum used in the preparation of the catalyst or contact mass of this invention can have any practical temper and purity. As stated, it is used in various shapes or sub-divided form.

It is usually necessary, for best results to be obtained, to preclean the surfaces of the aluminum to be used. Thus, when the surface of the aluminum is oily or has other organic material upon it, it can be washed with a water soluble organic solvent, such as acetone, or in any other satisfactory manner. Any traces of organic solvent can be washed away with water prior to the treatment with the sodium silicate solution. If there is present on the surfaces of the aluminum matter which cannot be washed off, it can be abraded off by tumbling the aluminum pieces, pellets or other shaped particles alone, or together with a suitable abrasive, such as emery dust. To prevent excessive wearing of the aluminum particles, these can be tumbled together with other masses also consisting of aluminum.

Example I

Aluminum rings ⅛ inch inside diameter, made from 22 gauge full-hard-temper wire were immersed in boiling acetone for about ½ hour following which the acetone was drained away and the rings washed with water. A treating solution containing 90% water and 10% $Na_2SiO_3.5H_2O$ was used. A volume of this solution, equal to about twice the solution of the rings to be treated, preheated to about 130° F. was then poured over the rings. A reaction was thus initiated. This reaction was allowed to proceed for about 10 minutes with moderate agitation to prevent sticking of the rings to each other, thus ensuring uniformity in the coating. Following this treatment, the treating solution was drained off and the treated rings were water-washed to remove all traces of said solution. The catalyst was then washed with acetone and air-dryed at about room temperature.

Example II

The foregoing procedure was employed except that a solution containing 5% $Na_2O$ and 15% $SiO_2$ (1:3) at 70° F. was used. The reaction was allowed to proceed for 30 minutes.

Example III

In still another preparation a solution of 3.34% of $Na_2SiO_3.5H_2O$ with 4.37% of added NaOH, making a ratio of $4.23Na_2O$ to $1SiO_2$ was used at 70° F. The reaction was effected for 5 minutes.

The coating formed during the treatment of the aluminum with the sodium silicate is believed to consist essentially of an agglomerate of hydrates of aluminum oxide, silicon oxide and aluminum silicate. Thus, according to the invention there is formed a catalyst or contact mass having a metallic aluminum core covered with a film consisting of a mixture of hydrates of aluminum oxide, silicon oxide and aluminum silicate.

It is obvious that other alkali silicates, such as potassium silicate, can be substituted for the sodium silicate. The silicates which can be used are readily determinable.

As stated, the catalyst or contact mass of the invention is particularly suited to the relative concentration of isotopes of oxygen and of carbon. Thus, oxygen (17) and oxygen (18) and carbon (13) and carbon (14) can be concentrated. The concentration of other isotopes of oxygen and carbon is not excluded. Likewise, it will be readily obvious that the catalyst or contact mass of this invention can be used to prepare pure oxygen (16) or pure carbon (12).

Modification and variation are possible within the scope of the appended claims to the invention the essence of which is that a novel catalyst or contact mass consisting essentially of aluminum coated with a mixture of hydrates of aluminum oxide, silicon oxide and aluminum silicate has been prepared employing a novel process comprising the step of treating sub-divided aluminum with sodium silicate as aforedescribed.

We claim:

1. In the process of relatively concentrating isotopes of carbon and of oxygen contained in compounds thereof by reacting carbon dioxide, carbonic acid, bicarbonate ion and water in the presence of a heterogeneous catalyst by flowing carbon dioxide into a mixture of carbon dioxide, carbonic acid, bicarbonate ion and water, and taking off from said heterogeneous catalyst a fluid enriched with the desired isotope, the improvement which comprises employing as said heterogeneous catalyst an aluminum packing which has been reacted with an alkali silicate.

2. In the process of relatively concentrating isotopes of carbon and of oxygen contained in compounds thereof by reacting carbon dioxide, carbonic acid, bicarbonate ion and water in the presence of a heterogeneous catalyst by flowing carbon dioxide into a mixture of carbon dioxide, carbonic acid, bicarbonate ion and water, and taking off from said heterogeneous catalyst a fluid enriched with the desired isotope, the improvement which comprises employing as the heterogeneous catalyst an aluminum packing which has been treated with a sodium silicate solution at a temperature in the range of from about room temperature to the boiling point of the solution, said sodium silicate solution being employed as a water solution containing $Na_2O$ and $SiO_2$ in a ratio of from $25Na_2O:1SiO_2$ to $1Na_2O:4SiO_2$.

3. In the process of relatively concentrating isotopes of carbon and of oxygen contained in compounds thereof by reacting carbon dioxide, carbonic acid, bicarbonate ion and water in the presence of a heterogeneous catalyst by flowing carbon dioxide into a mixture of carbon dioxide, carbonic acid, bicarbonate ion and water, and taking off from said heterogeneous catalyst a fluid enriched with the desired isotope, the improvement which comprises employing as said heterogeneous catalyst a metallic aluminum core covered with a film consisting of a mixture of hydrates of aluminum oxide, silicon oxide and aluminum silicate.

ARISTID V. GROSSE.
ALLEN F. REID.

REFERENCES CITED

The following references are of record in the file of this patent:

UNITED STATES PATENTS

| Number | Name | Date |
| --- | --- | --- |
| 2,400,409 | Hale et al. | May 14, 1946 |
| 2,435,796 | Reid | Feb. 10, 1948 |

OTHER REFERENCES

Soluble Silicates in Industry, by Vail, Chemical Catalog Co., 1928, pages 85, 86, 273, 274.